US012584443B2

(12) United States Patent
Durocher et al.

(10) Patent No.: US 12,584,443 B2
(45) Date of Patent: Mar. 24, 2026

(54) ACCELERATING TURBINE ENGINE ROTATING STRUCTURE WITH COMPRESSED AIR

(71) Applicant: Pratt & Whitney Canada Corp., Longueuil (CA)

(72) Inventors: Eric S. Durocher, Boucherville (CA); Michel Labrecque, Ste-Julie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/813,935

(22) Filed: Aug. 23, 2024

(65) Prior Publication Data

US 2026/0055729 A1 Feb. 26, 2026

(51) Int. Cl.
  *F02C 7/00* (2006.01)
  *F02C 7/057* (2006.01)
(52) U.S. Cl.
  CPC ........ *F02C 7/057* (2013.01); *F05D 2220/323* (2013.01)
(58) Field of Classification Search
  None
  See application file for complete search history.

(56) References Cited

U.S. PATENT DOCUMENTS 4,222,235 A * 9/1980 Adamson .................. F02K 3/08
                                                60/262
4,791,783 A * 12/1988 Neitzel ................... F02K 3/075
                                                60/226.3

5,251,447 A * 10/1993 Joshi ......................... F23R 3/14
                                              431/185
7,033,135 B2 * 4/2006 Mortzheim ........... F02C 7/1435
                                              415/115
11,859,554 B2 1/2024 Coutu
11,913,376 B2 2/2024 Shinde
2006/0104805 A1 * 5/2006 Gummer ............. F04D 27/0215
                                              415/58.5

(Continued)

FOREIGN PATENT DOCUMENTS

DE        1428188 U    11/1968
WO   2021110189 A1     6/2021

OTHER PUBLICATIONS

EP Search Report for EP Patent Application No. 25197441.6 dated Jan. 23, 2026.

*Primary Examiner* — Edwin Kang
(74) *Attorney, Agent, or Firm* — Getz Balich LLC

(57) ABSTRACT

An assembly for an aircraft powerplant includes a compressor rotor and an air system. The compressor rotor includes a plurality of compressor blades. The compressor blades are arranged circumferentially around the axis in a compressor blade array and are disposed in a flowpath. The air system includes an air source, an air injector and an air circuit fluidly coupling the air source to the air injector. The air system is configured to direct compressed air from the air source to the air injector through the air circuit. The air injector is configured to direct a stream of the compressed air into the flowpath and against one or more of the compressor blades to apply a rotational driving force onto the compressor rotor about an axis. The flowpath has a radial height at an injector location. The air injector projects a radial distance into the flowpath at the injector location.

15 Claims, 11 Drawing Sheets

(56)                    References Cited

U.S. PATENT DOCUMENTS

| | | | |
|---|---|---|---|
| 2014/0356128 A1 | 12/2014 | Bindl | |
| 2016/0040605 A1* | 2/2016 | Howarth | F02C 3/04 |
| | | | 60/785 |
| 2016/0312799 A1* | 10/2016 | Yu | F01D 9/041 |
| 2017/0096945 A1* | 4/2017 | Mueller | F02C 7/125 |
| 2017/0191500 A1* | 7/2017 | Lobocki | F04D 29/542 |
| 2017/0314471 A1* | 11/2017 | Sennoun | F28D 15/02 |
| 2018/0363677 A1* | 12/2018 | Kroger | F04D 29/681 |
| 2019/0323426 A1 | 10/2019 | Mackin | |
| 2023/0036374 A1* | 2/2023 | Coutu | F02C 6/20 |
| 2023/0220799 A1* | 7/2023 | Shinde | F02C 7/32 |
| | | | 60/226.1 |
| 2023/0323834 A1* | 10/2023 | Karve | F02C 7/04 |

* cited by examiner

ACCELERATING TURBINE ENGINE ROTATING STRUCTURE WITH COMPRESSED AIR

TECHNICAL FIELD

This disclosure relates generally to a turbine engine and, more particularly, to accelerating a rotating structure of the turbine engine.

BACKGROUND INFORMATION

A gas turbine engine for an aircraft powerplant includes one or more rotating assemblies. When a power setting for the turbine engine is rapidly increased, the engine rotating assemblies may have some lag in response as those engine rotating assemblies accelerate. Various systems and methods are known in the art for reducing engine response time to a rapid increase in power. While these known systems and methods have various benefits, there is still room in the art for improvement.

SUMMARY

According to an aspect of the present disclosure, an assembly is provided for an aircraft powerplant. This assembly includes a compressor section and an air system. The compressor section is arranged with a flowpath extending longitudinally through the compressor section. The compressor section includes a compressor rotor rotatable in a direction about an axis. The compressor rotor includes a plurality of compressor blades. The compressor blades are arranged circumferentially around the axis in a compressor blade array and are disposed in the flowpath. The air system includes an air source, an air injector and an air circuit fluidly coupling the air source to the air injector. The air system is configured to direct compressed air from the air source to the air injector through the air circuit. The air injector is configured to direct a stream of the compressed air into the flowpath and against one or more of the compressor blades to apply a rotational driving force onto the compressor rotor about the axis in the direction. The flowpath has a radial height at an injector location. The air injector projects a radial distance into the flowpath at the injector location. The radial distance is equal to or less than three-quarters of the radial height.

According to another aspect of the present disclosure, another assembly is provided for an aircraft powerplant. This assembly includes a compressor section and an air system. The compressor section is arranged with a flowpath extending longitudinally through the compressor section. The compressor section includes a compressor rotor and a compressor vane structure. The compressor rotor is rotatable about an axis and includes a plurality of compressor blades. The compressor blades are arranged circumferentially around the axis in a compressor blade array and are disposed in the flowpath. The compressor vane structure includes a plurality of compressor vanes. The compressor vanes are arranged circumferentially around the axis in a compressor vane array and are disposed in the flowpath. The air system includes an air source, an air injector and an air circuit fluidly coupling the air source to the air injector. The air system is configured to direct compressed air from the air source to the air injector through the air circuit. The air injector is configured to direct a jet of the compressed air into the flowpath and against the compressor blade array to apply a rotational driving force onto the compressor rotor about the axis. The air injector projects radially into the flowpath. The air injector is disposed longitudinally between and adjacent the compressor vane array and the compressor blade array.

According to still another aspect of the present disclosure, another assembly is provided for an aircraft powerplant. This assembly includes a compressor section and an air system. The compressor section is arranged with a flowpath extending longitudinally through the compressor section. The compressor section includes a compressor rotor and a compressor vane structure. The compressor rotor is rotatable about an axis and includes a plurality of compressor blades. The compressor blades are arranged circumferentially around the axis in a compressor blade array and are disposed in the flowpath. The compressor vane structure includes a plurality of compressor vanes. The compressor vanes are arranged circumferentially around the axis in a compressor vane array and are disposed in the flowpath. The air system includes an air source, an air injector and an air circuit fluidly coupling the air source to the air injector. The air system is configured to direct compressed air from the air source to the air injector through the air circuit. The air injector is configured to direct a jet of the compressed air into the flowpath and against the compressor blade array to apply a rotational driving force onto the compressor rotor about the axis. The air injector projects radially into the flowpath. The air injector is disposed circumferentially between and next to a respective circumferentially neighboring pair of the plurality of compressor vanes.

The compressor vanes may be longitudinally upstream of the compressor blades along the flowpath.

The flowpath may have a radial height at an injector location. The air injector may project a radial distance into the flowpath at the injector location. The radial distance may be equal to or greater than one-quarter of the radial height.

The radial distance may be between three-quarters of the radial height and one-half of the radial height.

The radial distance may be between one-half of the radial height and one-quarter of the radial height.

The radial distance may be equal to or less than one-half of the radial height.

The air injector may include a stem and a nozzle. The stem may project radially into the flowpath to a radial distal end of the air injector. The nozzle may project laterally out from the stem to a tip of the nozzle. The air injector may be configured to direct the stream of the compressed air into the flowpath and against the one or more of the compressor blades out from the tip of the nozzle.

The air injector may only include the stem and the nozzle.

The nozzle may be a first nozzle. The air injector may also include a second nozzle. The second nozzle may project laterally out from the stem to a tip of the second nozzle. The air injector may also be configured to direct a second stream of the compressed air into the flowpath and against one or more of the compressor blades to apply an additional rotational driving force onto the compressor rotor about the axis.

The first nozzle and the second nozzle may be arranged at different radial positions along the stem.

The air injector may include a passage and a nozzle orifice. The passage may extend radially within the air injector. The nozzle orifice may extend laterally through a wall of the air injector from the passage to the flowpath. The air injector may be configured to direct the stream of the compressed air into the flowpath through the nozzle orifice.

The air injector may be configured to direct the stream of the compressed air into the flowpath along a trajectory with an axial component and a tangential component.

The compressor section may also include a compressor vane structure. The compressor vane structure may include a plurality of compressor vanes. The compressor vanes may be arranged circumferentially around the axis in a compressor vane array and may be disposed in the flowpath upstream of the compressor blades. The air injector may be disposed in the flowpath longitudinally between and adjacent the compressor vane array and the compressor blade array.

The compressor section may also include a compressor vane structure. The compressor vane structure may include a plurality of compressor vanes. The compressor vanes may be arranged circumferentially around the axis in a compressor vane array and may be disposed in the flowpath upstream of the compressor blades. The air injector may be disposed in the flowpath circumferentially between and longitudinally overlapped by a respective circumferentially neighboring pair of the compressor vanes.

The air source may be configured as or otherwise include an air tank.

The air source may be configured as or otherwise include a turbine engine.

The assembly may also include a combustor section and a turbine section. The flowpath may extend longitudinally through the compressor section, the combustor section and the turbine section from an inlet into the flowpath to an exhaust from the flowpath.

The assembly may also include a propulsor rotor, a first turbine engine, a second turbine engine and a drivetrain. The first turbine engine may include the compressor section and a first rotating assembly. The second turbine engine may include a second rotating assembly. The drivetrain may be configured to operatively couple the first rotating assembly and the second rotating assembly to the propulsor rotor.

The present disclosure may include any one or more of the individual features disclosed above and/or below alone or in any combination thereof.

The foregoing features and the operation of the invention will become more apparent in light of the following description and the accompanying drawings.

4

Figure 8:
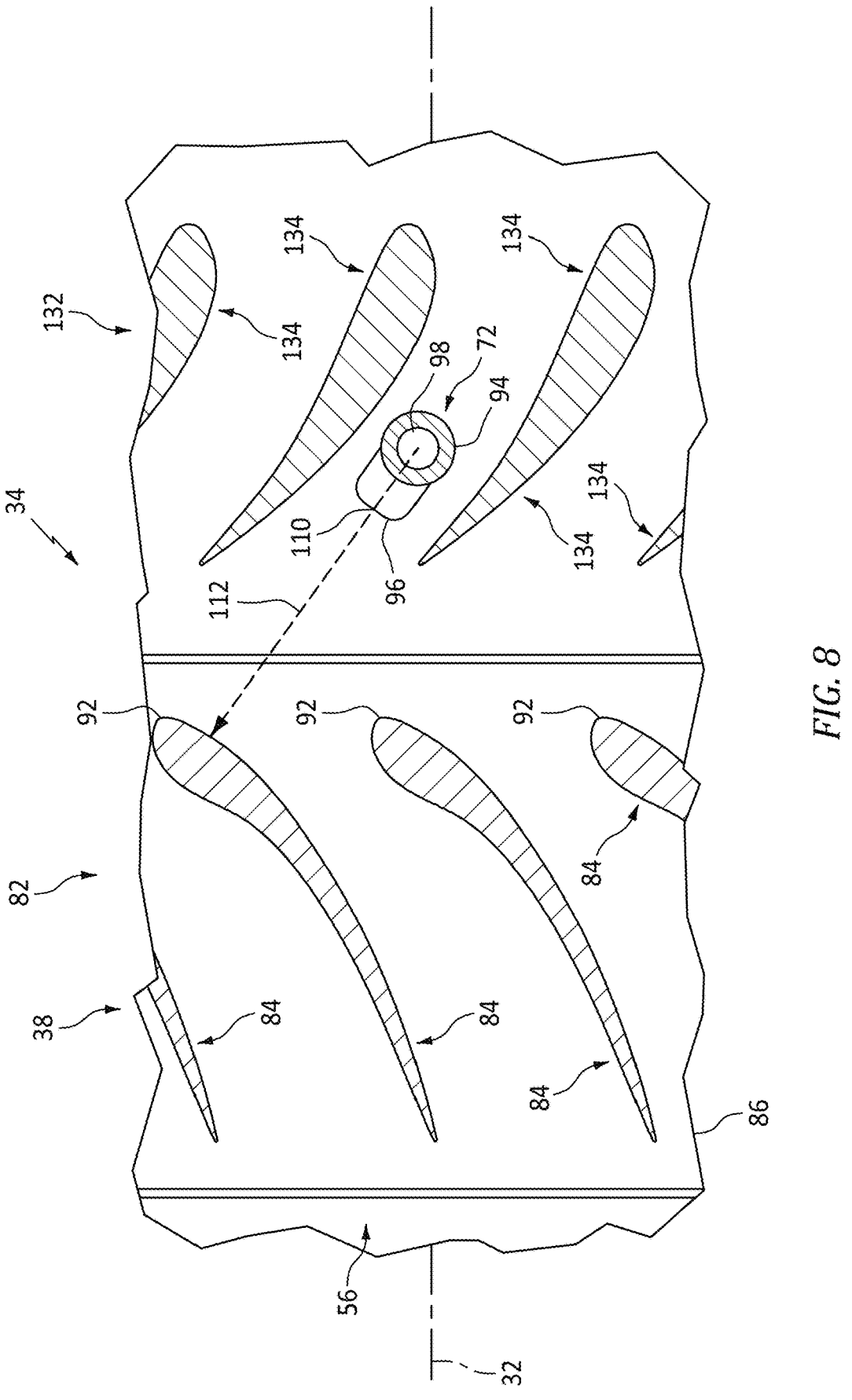

FIG. 8 is a partial plan view schematic illustration of the air injector array and compressor vane structure arrangement.

Figure 9:
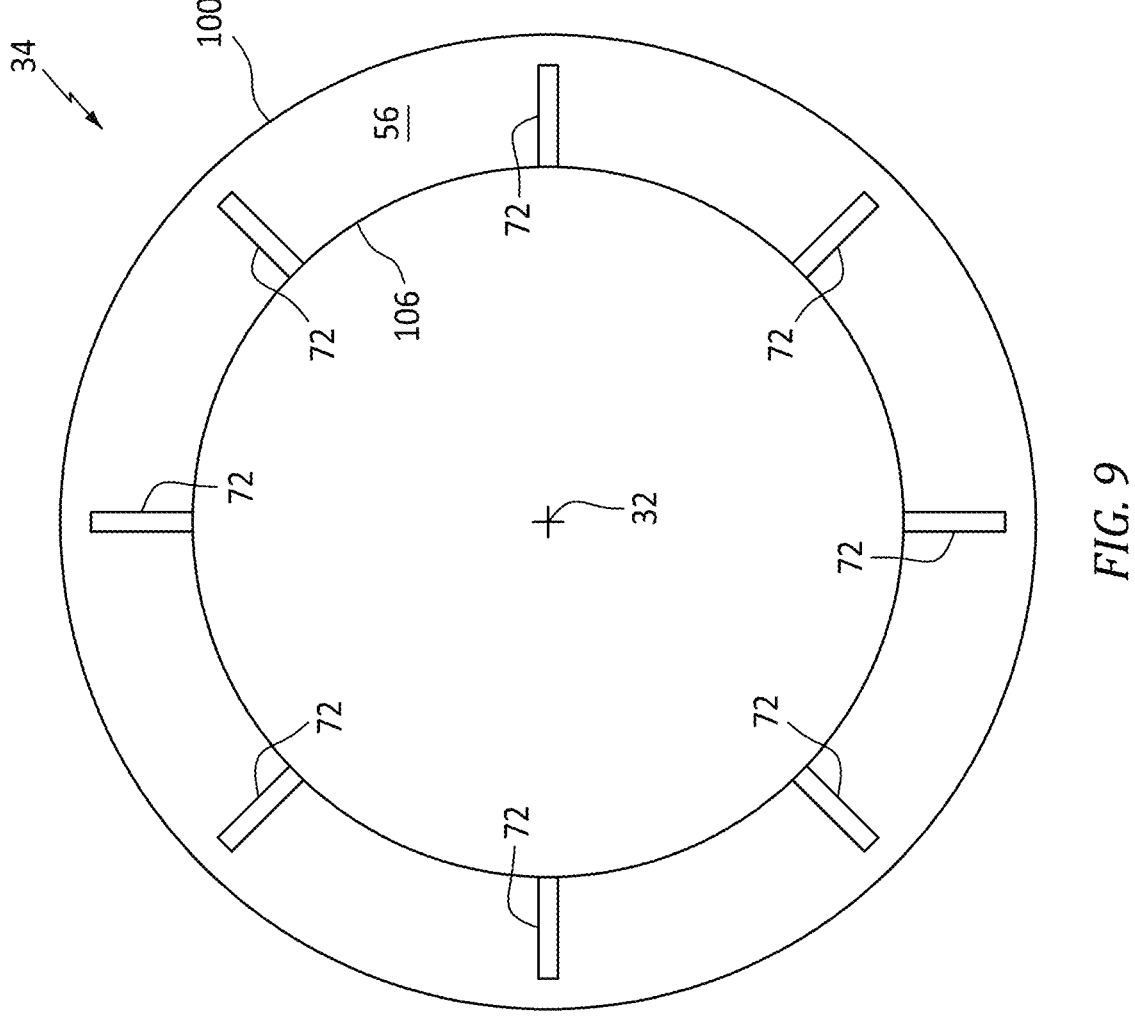

FIG. 9 is a schematic illustration of the core flowpath at air injector array with another arrangement of its air injectors.

Figure 10:
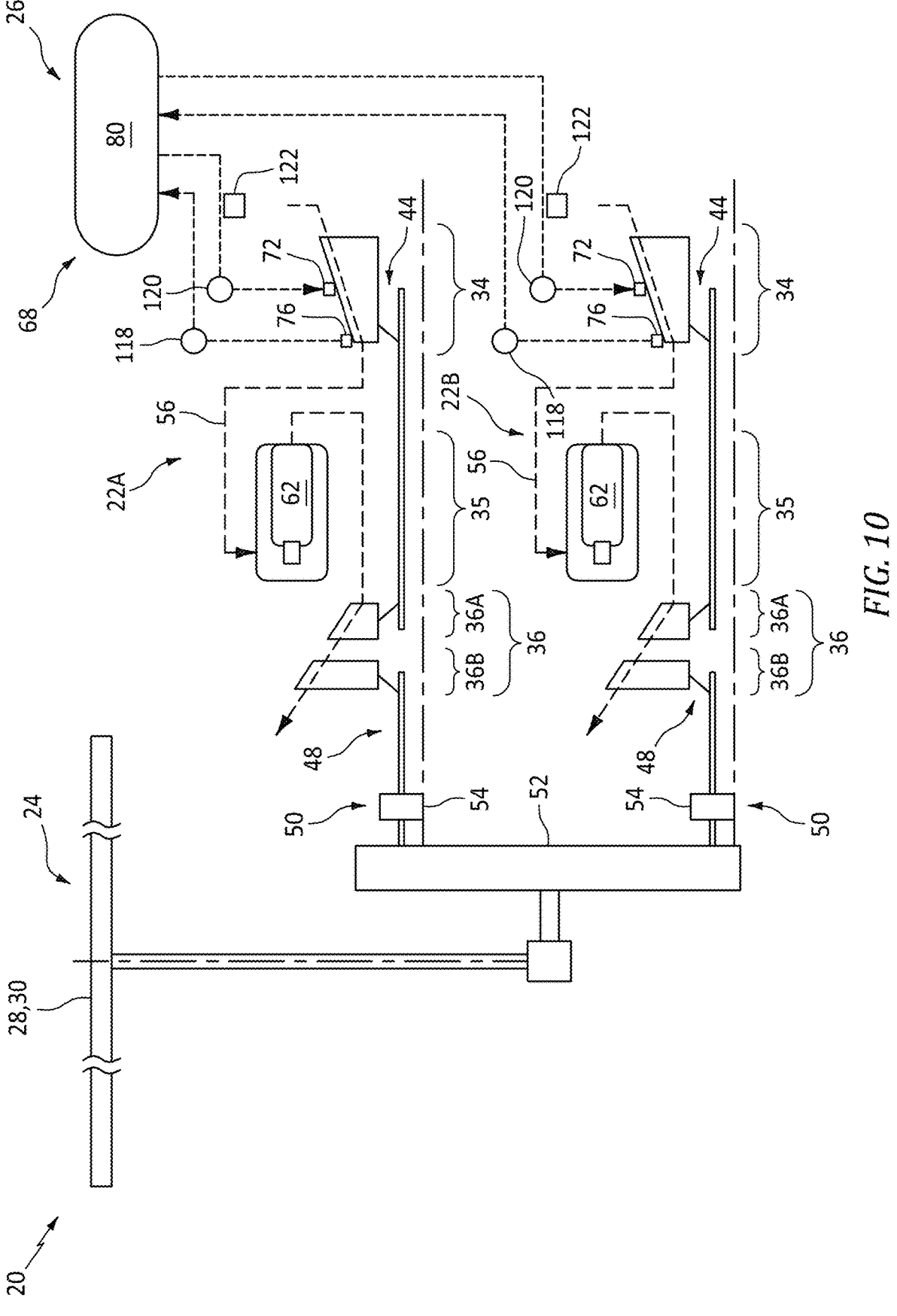

FIG. 10 is a partial schematic illustration of the aircraft powerplant with multiple turbine engines.

DETAILED DESCRIPTION

Figure 1:
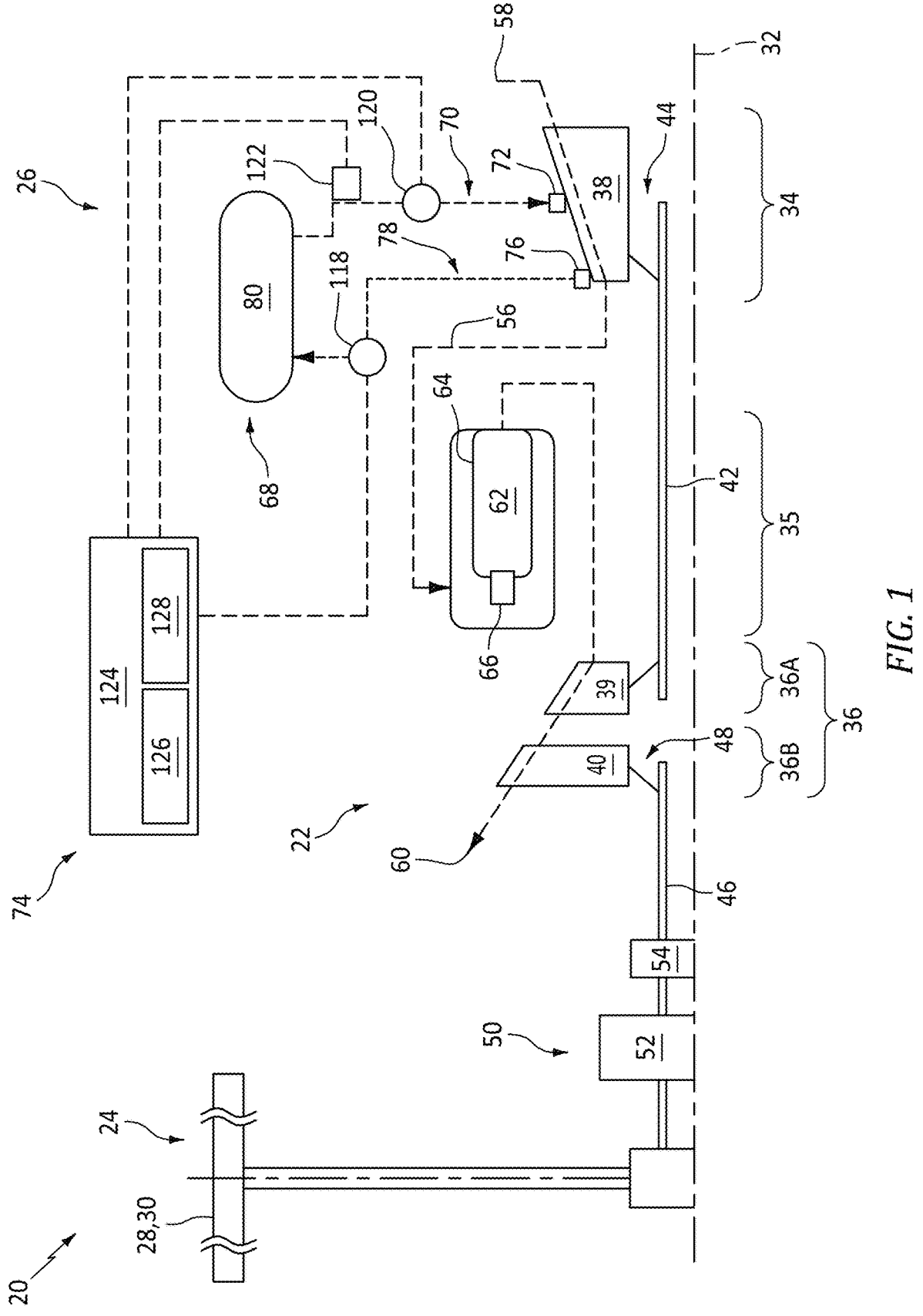
FIG. 1 is a partial schematic illustration of an aircraft powerplant.

FIG. 1 illustrates a powerplant 20 for an aircraft with a gas turbine engine 22. The aircraft may be a rotorcraft (e.g., a helicopter), an airplane, a drone (e.g., an unmanned aerial vehicle (UAV)), or any other manned or unmanned aerial vehicle or system. For ease of description, the aircraft powerplant 20 is described below as a propulsion system for the aircraft such as a rotorcraft propulsion system, and the turbine engine 22 is described below as a turboshaft engine. The present disclosure, however, is not limited to such an exemplary aircraft propulsion system nor to such an exemplary turbine engine. The aircraft propulsion system, for example, may alternatively be configured as a turboprop propulsion system, a turbofan propulsion system or an open rotor propulsion system. Moreover, the aircraft powerplant 20 of the present disclosure is not limited to propulsion system applications. The aircraft powerplant 20, for example, may alternatively be configured as or included as part of an auxiliary power unit (APU) for the aircraft.

The aircraft powerplant 20 of FIG. 1 includes the turbine engine 22 and a mechanical load 24, where the turbine engine 22 is configured to power operation of the mechanical load 24. The aircraft powerplant 20 also includes an air system 26 for the turbine engine 22.

The mechanical load 24 may be configured as or otherwise include a rotor 28 mechanically driven by the turbine engine 22. For ease of description, this driven rotor 28 is described below as a bladed propulsor rotor 30 such as a rotorcraft rotor (e.g., a main helicopter rotor, a helicopter tail rotor, etc.) for the aircraft propulsion system. The present disclosure, however, is not limited to such an exemplary bladed rotor and may be configured as another type of open propulsor rotor (e.g., an un-ducted rotor), a ducted propulsor rotor or any other type of air mover. The propulsor rotor 30, for example, may alternatively be configured as a propeller rotor or a fan rotor. Moreover, the driven rotor 28 of the present disclosure is not limited to propulsor rotor applications. The driven rotor 28, for example, may alternatively be configured as or otherwise include a generator rotor of an electric power generator for the auxiliary power unit.

The turbine engine 22 of FIG. 1 extends axially along an axis 32 between a first end of the turbine engine 22 and a second end of the turbine engine 22. Briefly, the axis 32 may be a centerline axis of the turbine engine 22 and/or one or more of its members. The axis 32 may also or alternatively be a rotational axis for one or more members of the turbine engine 22. The turbine engine 22 of FIG. 1 includes a compressor section 34, a combustor section 35 and a turbine section 36. The turbine section 36 of FIG. 1 includes a high pressure turbine (HPT) section 36A and a low pressure turbine (LPT) section 36B. The LPT section 36B of FIG. 1 is configured as a power turbine (PT) section of the turbine engine 22, where this power turbine section of FIG. 1 is dedicated to powering operation of the mechanical load 24 and its propulsor rotor 30. The present disclosure, however, is not limited to such an exemplary arrangement. The LPT section 36B, for example, may also power operation of another (e.g., a low pressure) compressor section.

The engine sections 34-36B of FIG. 1 may be arranged sequentially along the axis 32. The compressor section 34 includes a bladed compressor rotor 38. The HPT section 36A includes a bladed high pressure turbine (HPT) rotor 39. The LPT section 36B includes a bladed low pressure turbine (LPT) rotor 40; e.g., a power turbine (PT) rotor. The compressor rotor 38, the HPT rotor 39 and the LPT rotor 40 as well as the propulsor rotor 30 each respectively include one or more arrays (e.g., stages) of rotor blades, where the rotor blades in each array are arranged circumferentially around and are connected to a respective rotor base (e.g., a disk or hub). The rotor blades in each array, for example, may be formed integral with or mechanically fastened, welded, brazed and/or otherwise attached to the respective rotor disk and/or hub.

The compressor rotor 38 is coupled to and rotatable with the HPT rotor 39. The compressor rotor 38 of FIG. 1, for example, is connected to the HPT rotor 39 by a high speed shaft 42. At least (or only) the compressor rotor 38, the HPT rotor 39 and the high speed shaft 42 collectively form a high speed rotating assembly 44; e.g., a high speed spool of the turbine engine 22. This high speed rotating assembly 44 and its members 38, 39 and 42 may be rotatable about the axis 32.

The LPT rotor 40 of FIG. 1 is connected to a low speed shaft 46. At least (or only) the LPT rotor 40 and the low speed shaft 46 collectively form a low speed rotating assembly 48; e.g., a low speed spool of the turbine engine 22. This low speed rotating assembly 48 and its members 40 and 46 may be rotatable about the axis 32.

The low speed rotating assembly 48 is coupled to the propulsor rotor 30 through a drivetrain 50. The drivetrain 50 of FIG. 1 is configured as a geared drivetrain, where the drivetrain 50 includes a geartrain 52 (e.g., a gearbox, a reduction gear system and/or a transmission) disposed between and operatively coupling the propulsor rotor 30 to the low speed rotating assembly 48 and its LPT rotor 40. It is contemplated, however, the drivetrain 50 may alternatively be configured as a direct drive drivetrain where the geartrain 52 is omitted. The drivetrain 50 of FIG. 1 also includes a clutch 54 (e.g., an overrunning clutch) disposed between and selectively coupling the turbine engine 22 to the propulsor rotor 30. More particularly, the clutch 54 of FIG. 1 is disposed between and selectively couples the low speed rotating assembly 48 and its LPT rotor 40 to the geartrain 52.

The turbine engine 22 includes a (e.g., annular) core flowpath 56. This core flowpath 56 extends longitudinally within the turbine engine 22 from an airflow inlet 58 into the core flowpath 56 to a combustion products exhaust 60 from the core flowpath 56. More particularly, the core flowpath 56 extends longitudinally from the core inlet 58, sequentially through the compressor section 34, the combustor section 35, the HPT section 36A and the LPT section 36B, to the core exhaust 60. The core inlet 58 may also be an airflow inlet into the turbine engine 22 from an environment external to the turbine engine 22 and, more generally, the aircraft. The core exhaust 60 may also be a combustion products exhaust from the turbine engine 22 into external environment.

During operation of the turbine engine 22, air (e.g., ambient air from the external environment) is directed into the turbine engine 22 and its core flowpath 56 through the core inlet 58. This air entering the core flowpath 56 may be referred to as core air. The core air is compressed by the compressor rotor 38 and directed into a combustion chamber 62 (e.g., an annular combustion chamber) within a combustor 64 (e.g., an annular combustor) of the combustor section 35. Fuel is injected into the combustion chamber 62 by one or more fuel injectors 66 and mixed with the compressed core air to provide a fuel-air mixture. This fuel-air mixture is ignited and combustion products thereof flow through and sequentially drive rotation of the HPT rotor 39 and the LPT rotor 40. The rotation of the HPT rotor 39 drives rotation of the compressor rotor 38 and, thus, the compression of the air received from the core inlet 58. The rotation of the LPT rotor 40 drives rotation of the propulsor rotor 30 through the drivetrain 50. The rotation of the propulsor rotor 30 propels the air within the external environment to provide aircraft thrust and/or lift.

Under certain operating conditions and/or during certain operating modes (e.g., an eco-mode, a sleep mode, etc.), the turbine engine 22 may be operated at a relatively low power setting such as idle or sub-idle. While operating at this low power setting, the aircraft powerplant 20 may reduce fuel consumption and/or emissions associated with the turbine engine 22. However, when an operator (e.g., a pilot) calls for a rapid power increase, there may be a lag in response from the turbine engine 22 as its engine rotating assemblies 44 and 48 spool up; e.g., accelerate in speed. The air system 26 is therefore arranged with the turbine engine 22 to facilitate a rapid power increase while reducing engine response time as described below in further detail. The air system 26 of FIG. 1 includes an air source 68, an air feed circuit 70, one or more air injectors 72 and an air control system 74.

The air source 68 is configured to supply compressed air during operation of the air system 26. The air source 68 of FIG. 1, for example, includes a bleed 76 of the turbine engine 22, an air supply circuit 78 and an air tank 80. The bleed 76 is located along the core flowpath 56 within or downstream of the compressor section 34. The bleed 76 of FIG. 1, for example, is located at (e.g., on, adjacent or proximate) a downstream end of the compressor section 34. This bleed 76 may be configured as an orifice (or orifices) in and/or a scoop along a flowpath wall which forms a peripheral boundary of the core flowpath 56. The air supply circuit 78 fluidly couples and may extend between the bleed 76 and an inlet into the air tank 80. With this arrangement, an internal cavity of the air tank 80 may be charged (and/or recharged) during aircraft operation (e.g., aircraft flight) with the compressed air using air bled from the compressor section 34. For example, when the turbine engine 22 is operating at a relatively high power setting, some of the core air may be bled from the core flowpath 56 through the bleed 76 and directed into the air tank 80 through the air supply circuit 78. The air source 68 of the present disclosure, however, is not limited to such an exemplary charging (and/or recharging) arrangement. For example, the air tank 80 may also or alternatively be pre-charged (e.g., charged prior to turbine engine operation) with the compressed air using another compressed air source external to the aircraft, for example when the aircraft is on ground. In another example, where the aircraft includes another gas turbine engine, a bleed from this other turbine engine may also be fluidly coupled to the air tank 80 through the air supply circuit 78 to charge (and/or recharge) the compressed air within the air tank 80. In still another example, the air tank 80 may be omitted and the bleed from the other turbine engine may be directly coupled to the air feed circuit 70 as the air source 68.

The air feed circuit 70 fluidly couples and may extend between an outlet from the air source 68 and an inlet into each of the air injectors 72. In FIG. 1, the outlet from the air source 68 is also an outlet from the air tank 80.

Figure 2:
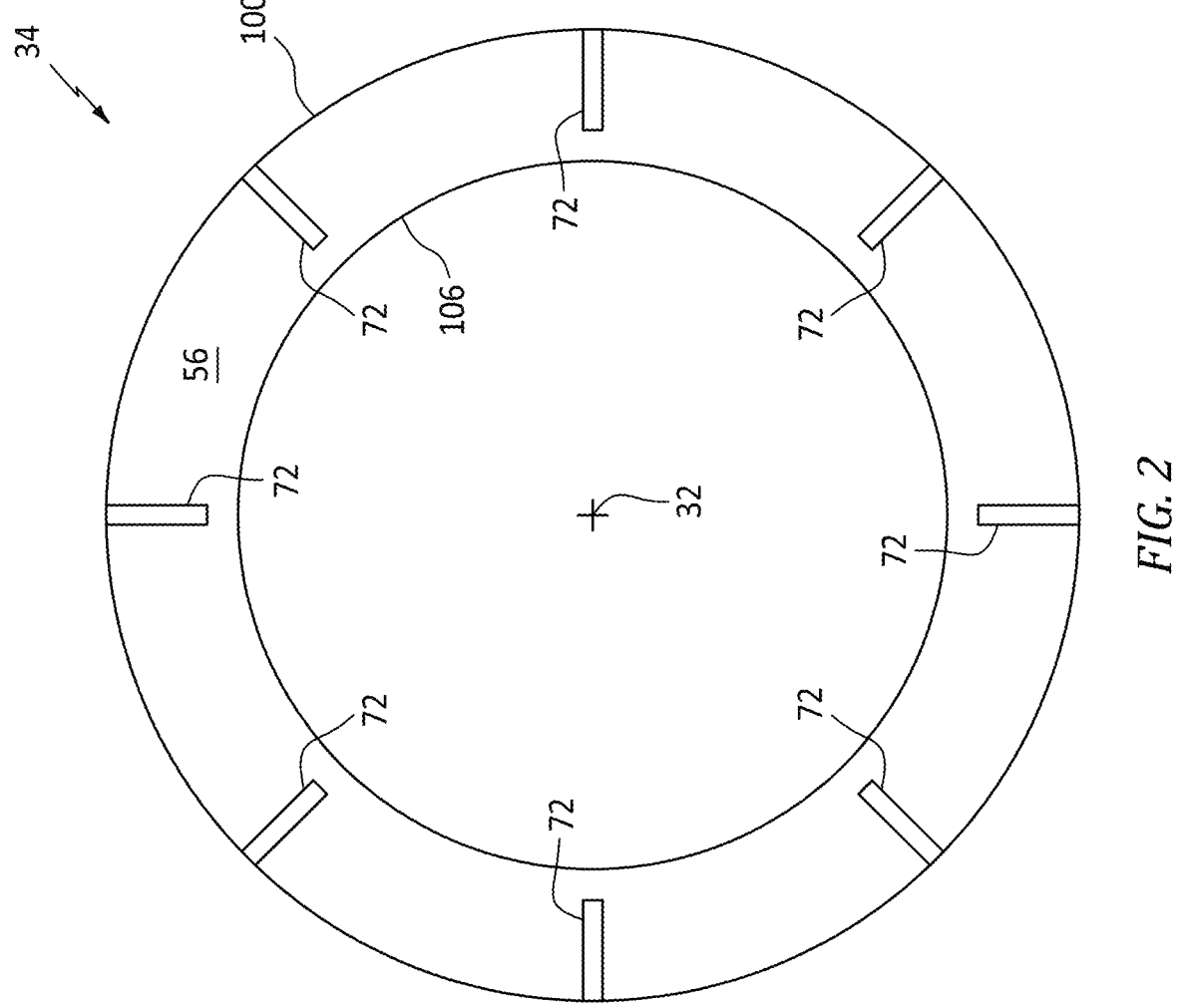
FIG. 2 is a schematic illustration of a core flowpath at an array of air injectors.
Figure 3:
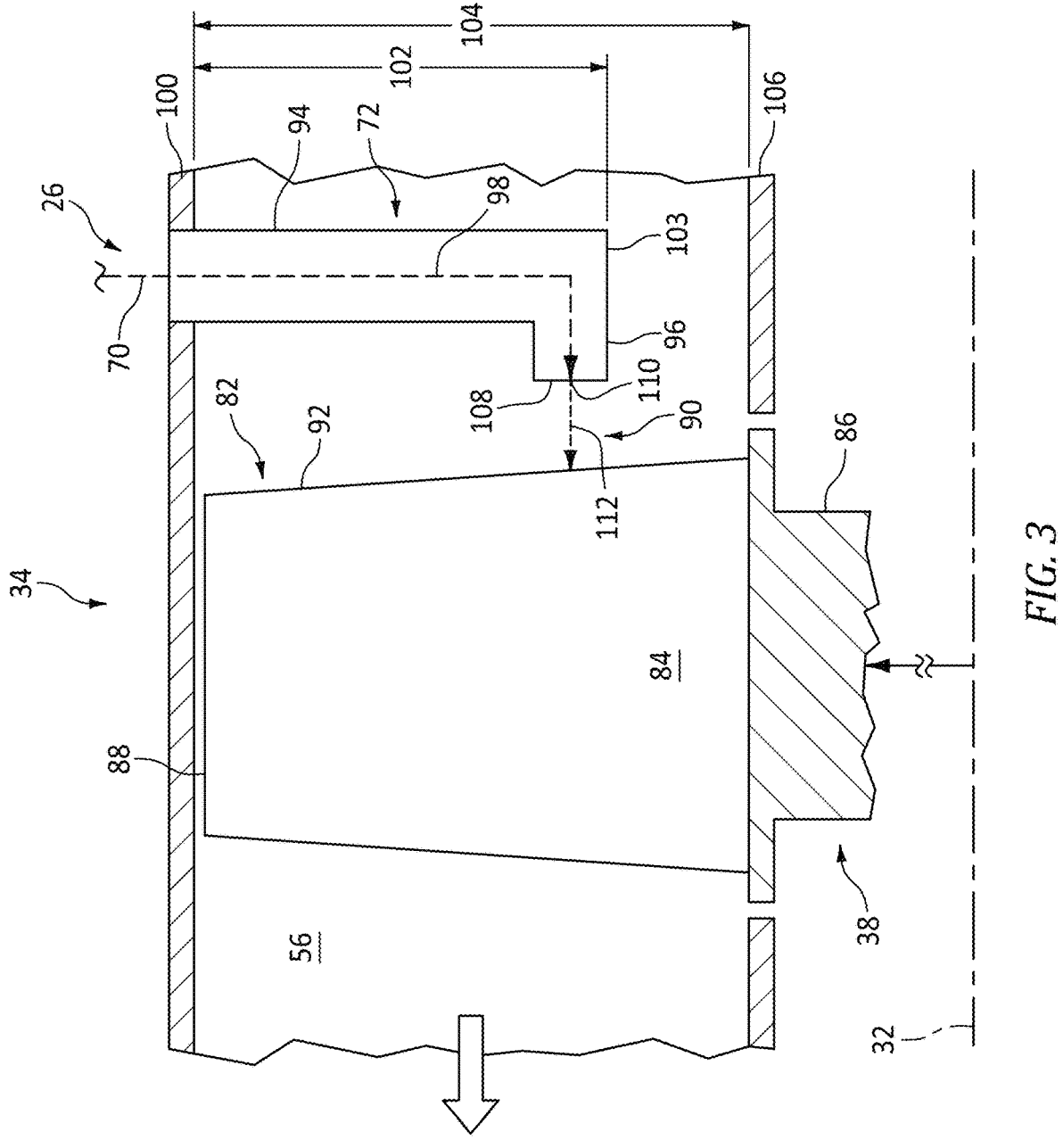
FIG. 3 is a partial schematic illustration along the core flowpath within a compressor section at the air injector array.

Referring to FIG. 2, the air injectors 72 are arranged circumferentially and may be equispaced about the axis 32 in an annular array; e.g., a circular array. Referring to FIG. 3, each of the air injectors 72 is disposed within the core flowpath 56 next to a stage 82 of the compressor rotor 38. This compressor rotor stage 82 may be a first stage, a last stage or an intermediate stage of the compressor rotor 38 (or the only stage of the compressor rotor 38). Briefly, the compressor rotor stage 82 includes a plurality of compressor blades 84 (e.g., rotor blades) that are arranged and equispaced circumferentially around a rotor base 86 (e.g., a disk or hub) of the compressor rotor 38 in an annular array; e.g., a circular array. Each of these compressor blades 84 projects spanwise out from the rotor base 86, substantially radially outward across the core flowpath 56, to a tip 88 of the respective compressor blade 84. Each air injector 72 of FIG. 3 projects radially into the core flowpath 56 at an injector location (a location of the respective air injector 72) where the respective air injector 72 is longitudinally adjacent the compressor rotor stage 82 and its array of the compressor blades 84. Each air injector 72, however, may be (e.g., slightly) longitudinally spaced from the compressor rotor stage 82 and its array of the compressor blades 84 by a gap 90; e.g., a longitudinally unobstructed/empty air gap. Although each air injector 72 may be (e.g., slightly) longitudinally spaced from the compressor rotor stage 82 and its array of the compressor blades 84, there may be no other structures in the core flowpath 56 longitudinally between the respective air injector 72 and the array of the compressor blades 84.

Each air injector 72 may be disposed upstream of the compressor rotor stage 82 and its array of the compressor blades 84. Each air injector 72 of FIG. 3, for example, is arranged next to and longitudinally upstream of leading edges 92 of the compressor blades 84 along the core flowpath 56. Each air injector 72 of FIG. 3 includes an injector stem 94, an injector nozzle 96 and at least (or only) one internal injector passage 98 (e.g., an air passage).

The injector stem 94 may be mounted to a flowpath wall 100 within the turbine engine 22. For ease of description, the flowpath wall 100 is described below as a radial outer flowpath wall that forms a radial outer peripheral boundary of the core flowpath 56 at least upstream of the compressor rotor stage 82 and its array of the compressor blades 84. This flowpath wall 100 may be the same as or different than the flowpath wall arranged with the bleed 76 (see FIG. 1). The injector stem 94 of FIG. 3 projects out (e.g., in a radial inward direction towards the axis 32) from the flowpath wall 100, a radial distance 102 into the core flowpath 56, to a radial (e.g., inner) distal end 103 of the respective air injector 72 and its injector stem 94. Here, the radial distance 102 is also a measure of a radial height of the injector stem 94 and, more generally, the respective air injector 72. The radial distance 102 may be sized equal to or less than four-fifths (⅘) or three-quarters (¾) of a radial height 104 of the core flowpath 56 at this same injector location, where the radial height 104 is measured as a radial distance between opposing flowpath walls 100 and 106 lining the core flowpath 56 at the respective injector location. For example, the radial distance 102 may be between four-fifths (⅘) or three-quarters (¾) of the radial height 104 and one-half (½) of the radial height 104 to align the injector nozzle 96 with base end regions of the compressor blades 84. In another example, the radial distance 102 may be between one-half (½) of the radial height 104 and one-quarters (¼) or one-fifth (⅕) of the radial height 104 to align the injector nozzle 96 with tip end regions of the compressor blades 84. With such an arrangement, the injector nozzle 96 may be placed outside of boundary layer flows within the core flowpath 56. The present disclosure, however, is not limited to the foregoing exemplary dimensional relationships. The radial distance 102, for example, may be equal to or less than one-quarters (¼) or one-fifth (⅕) of the radial height 104 for select applications.

The injector nozzle 96 is connected (e.g., formed integral with or otherwise attached to) the injector stem 94 at the injector distal end 103. The injector nozzle 96 projects laterally (e.g., longitudinally and/or tangentially relative to a reference circle around the axis 32) out from the injector stem 94, in a direction towards the compressor rotor stage 82 and its array of the compressor blades 84, to a tip 108 of the injector nozzle 96.

Figure 4:
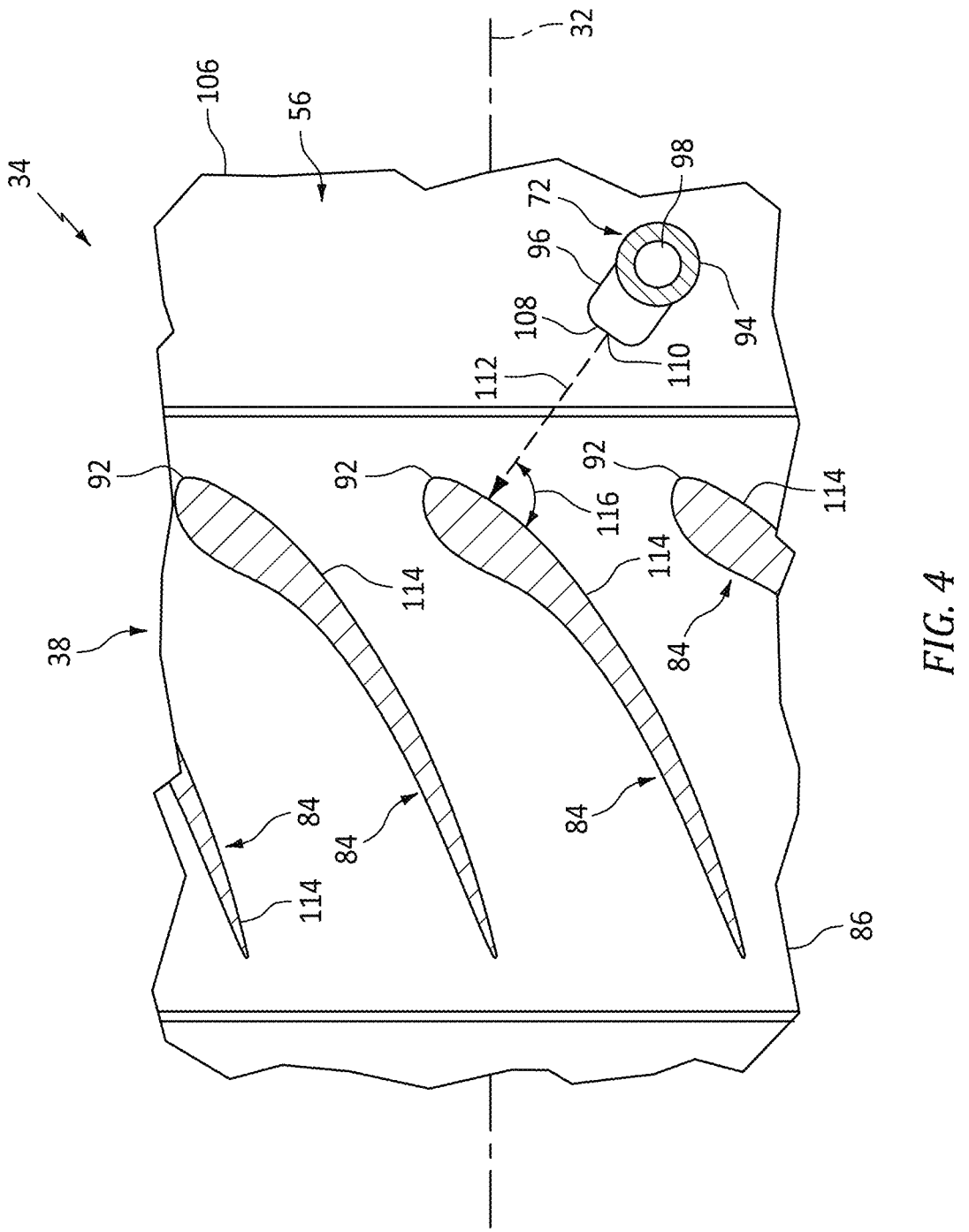
FIG. 4 is a partial plan view schematic illustration along the core flowpath within the compressor section at the air injector array.

The injector passage 98 is fluidly coupled to the air feed circuit 70, for example in parallel with injector passages 98 of the other air injectors 72 (see FIG. 2). The injector passage 98 extends through the injector stem 94 and then the injector nozzle 96 to a nozzle orifice 110; e.g., an outlet from the respective air injector 72 and its injector passage 98. At the nozzle orifice 110, the injector passage 98 follows a nozzle trajectory 112 that points to the compressor rotor stage 82 and its array of the compressor blades 84. Referring to FIG. 4, the nozzle trajectory 112 may include a longitudinal (e.g., axial) component and a tangential component relative to the reference circle around the axis 32. This nozzle trajectory 112 may be selected such that, for example, when the nozzle trajectory 112 points to a pressure side surface 114 of a respective one of the compressor blades 84 at its leading edge 92, the nozzle trajectory 112 is angularly offset from that pressure side surface 114 by an offset angle 116 equal to ninety degrees (90°). However, it is contemplated the offset angle 116 may alternatively be within plus and/or minus (+/−) ten degrees (10°), twenty degrees (20°) or thirty degrees (30°) of ninety degrees (90°). Referring to FIG. 3, the nozzle trajectory 112 may be parallel with a trajectory of the core flowpath 56. It is contemplated, however, the nozzle trajectory 112 may alternatively be angled (e.g., slightly) radially outward or inward towards one of the flowpath walls 100 and 106.

Referring to FIG. 1, the air control system 74 is configured to control operation of the air system 26. The air control system 74 of FIG. 1, for example, includes one or more valves 118 and 120, a pressure sensor 122 and a controller 124.

The supply circuit valve 118 is arranged inline along the air supply circuit 78. This supply circuit valve 118 is configured to selectively fluidly couple or uncouple the bleed 76 and the air tank 80. The supply circuit valve 118 may also be configured to regulate a flowrate of the bled core air from the bleed 76 to the air tank 80.

The feed circuit valve 120 is arranged inline along the air feed circuit 70. This feed circuit valve 120 is configured to selectively fluidly couple or uncouple the air tank 80 and the air injectors 72. The feed circuit valve 120 may also be configured to regulate a flowrate of the compressed air from the air tank 80 to the air injectors 72.

The pressure sensor 122 is configured to measure a pressure of the compressed air directed through the air feed circuit 70 to the air injectors 72. The pressure sensor 122 of FIG. 1, for example, is located along the air feed circuit 70 between the outlet of the air tank 80 and the feed circuit valve 120.

The controller 124 is arranged in signal communication (e.g., hardwired and/or wirelessly coupled) with the supply circuit valve 118, the feed circuit valve 120 and the pressure sensor 122. This controller 124 may be configured as an onboard engine controller for the aircraft; e.g., an electronic engine controller (EEC), an electronic control unit (ECU), a full-authority digital engine controller (FADEC), etc. The controller 124 may be implemented with a combination of hardware and software. The hardware may include memory 126 and at least one processing device 128, which processing device 128 may include one or more single-core and/or multi-core processors. The hardware may also or alternatively include analog and/or digital circuitry other than that described above.

The memory 126 is configured to store software (e.g., program instructions) for execution by the processing device 128, which software execution may control and/or facilitate performance of one or more operations such as those described below. The memory 126 may be a non-transitory computer readable medium. For example, the memory 126 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

During air system operation, the air tank 80 may be charged (or recharged) with compressed air using core air bled form the core flowpath 56. For example, when an available pressure of the compressed air within the air tank 80 is below a threshold level (e.g., measured at the pressure sensor 122) and the turbine engine 22 is operating at or above a threshold power level, the controller 124 may signal the supply circuit valve 118 to open. Core air bled from the core flowpath 56 may then be directed into the air tank 80. Once the available pressure of the compressed air within the air tank 80 is equal to or above the threshold level (e.g., measured at the pressure sensor 122) or the turbine engine 22 begins operating below the threshold power level, the controller 124 may signal the supply circuit valve 118 to close. The air tank 80 may thereby be charged (or recharged) by the turbine engine 22 prior to operation at its relatively low power setting such as idle or sub-idle. By contrast, to facilitate a rapid power increase of the turbine engine 22 following operation of the turbine engine 22 at its relatively low power setting, the controller 124 may signal the feed circuit valve 120 to open. A flow of the compressed air may thereby be directed, from the air tank 80, through the air feed circuit 70 to each of the air injectors 72, in parallel. Referring to FIG. 4, each of the air injectors 72 and its injector nozzle 96 may then direct a stream (e.g., a jet) of the compressed air out of the respective air injector 72, into the core flowpath 56 and against the compressor rotor stage 82 and, more particularly, against a respective one of its compressor blades 84 as that compressor blade 84 crosses the respective nozzle trajectory 112. In this manner, each stream of the compressed air may apply a rotational driving force onto the compressor rotor 38 about the axis 32. The air system 26 may thereby boost rotational driving power to the compressor rotor 38 to facilitate a more rapid acceleration of the high speed rotating assembly 44 and its compressor rotor 38 about the axis 32.

Figure 5:
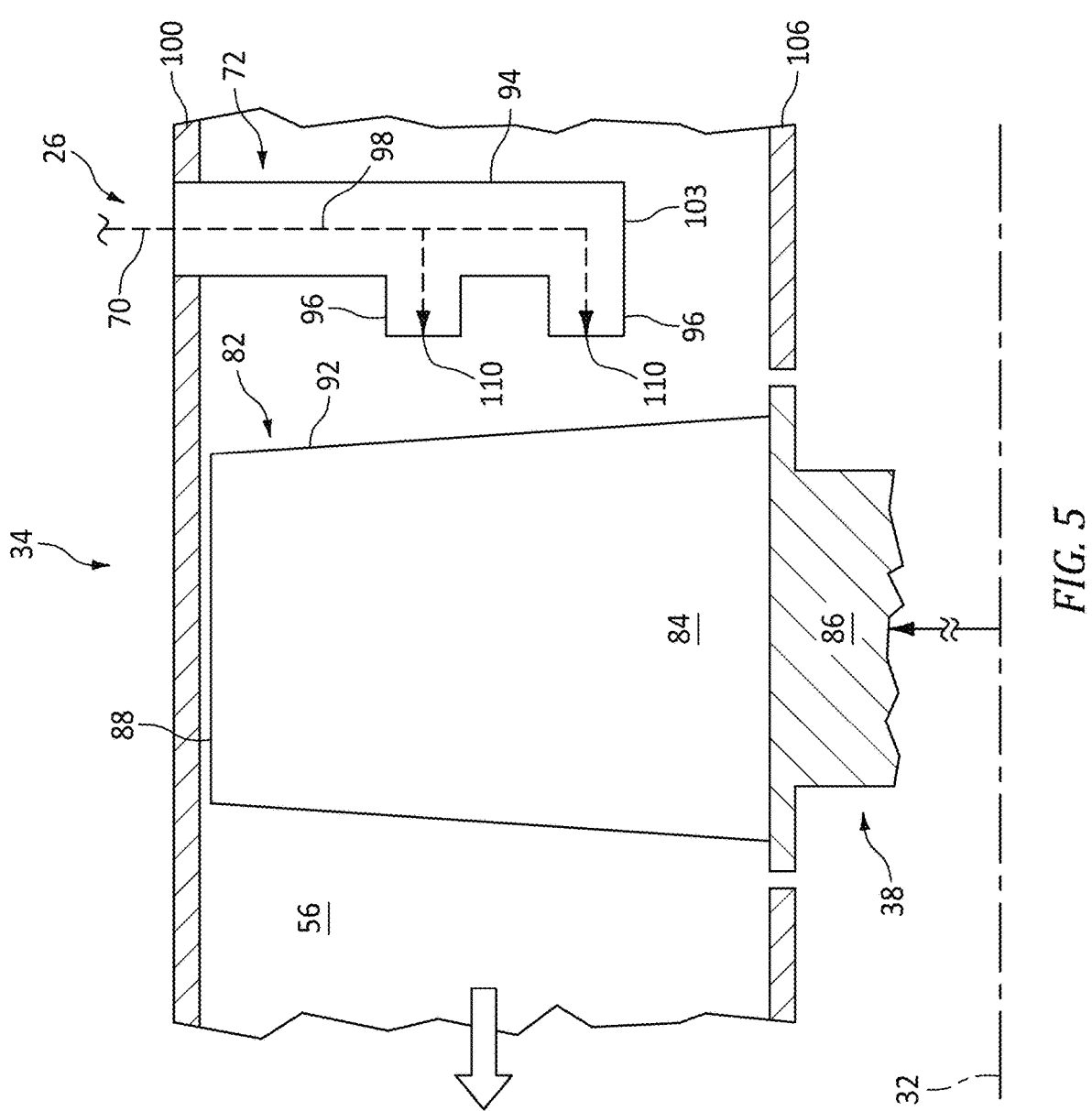
FIG. 5 is a partial schematic illustration along the core flowpath within the compressor section at the air injector array with another air injector configuration.
Figure 6:
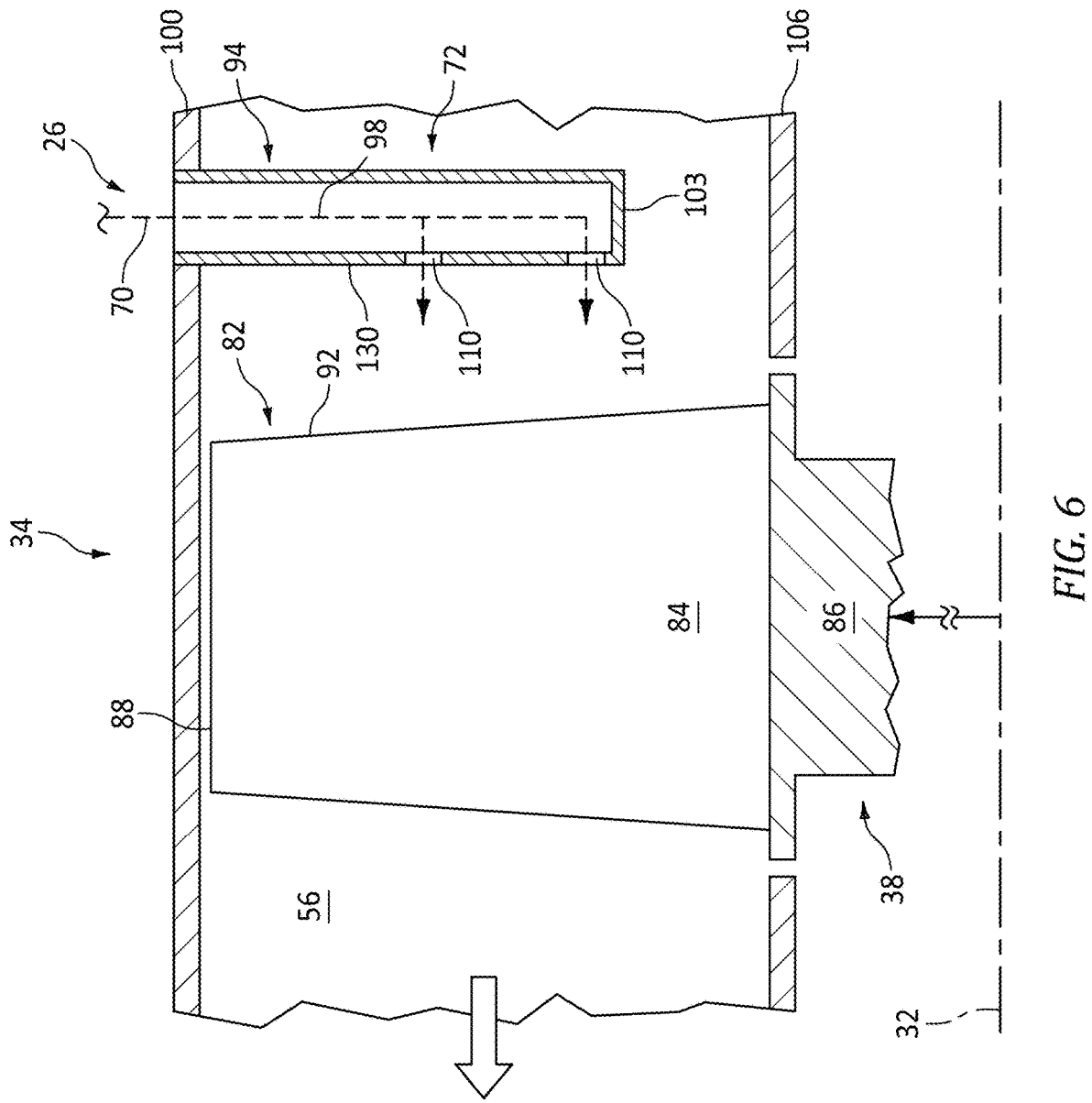
FIG. 6 is a partial schematic illustration along the core flowpath within the compressor section at the air injector array with still another air injector configuration.

In some embodiments, referring to FIG. 3, each air injector 72 may be configured with a single injector nozzle 96. In other embodiments, referring to FIG. 5, one or more or all of the air injectors 72 may each include multiple of the injector nozzles 96 arranged at different radial positions along the injector stem 94. In still other embodiments, referring to FIG. 6, the one or more injector nozzles may be integrated into a sidewall 130 of the injector stem 94. The nozzle orifice(s) 110 of FIG. 6, for example, may project through the sidewall 130 of the injector stem 94 thereby fluidly coupling the injector passage 98 to the core flowpath 56 outside of the respective air injector 72.

Figure 7A:
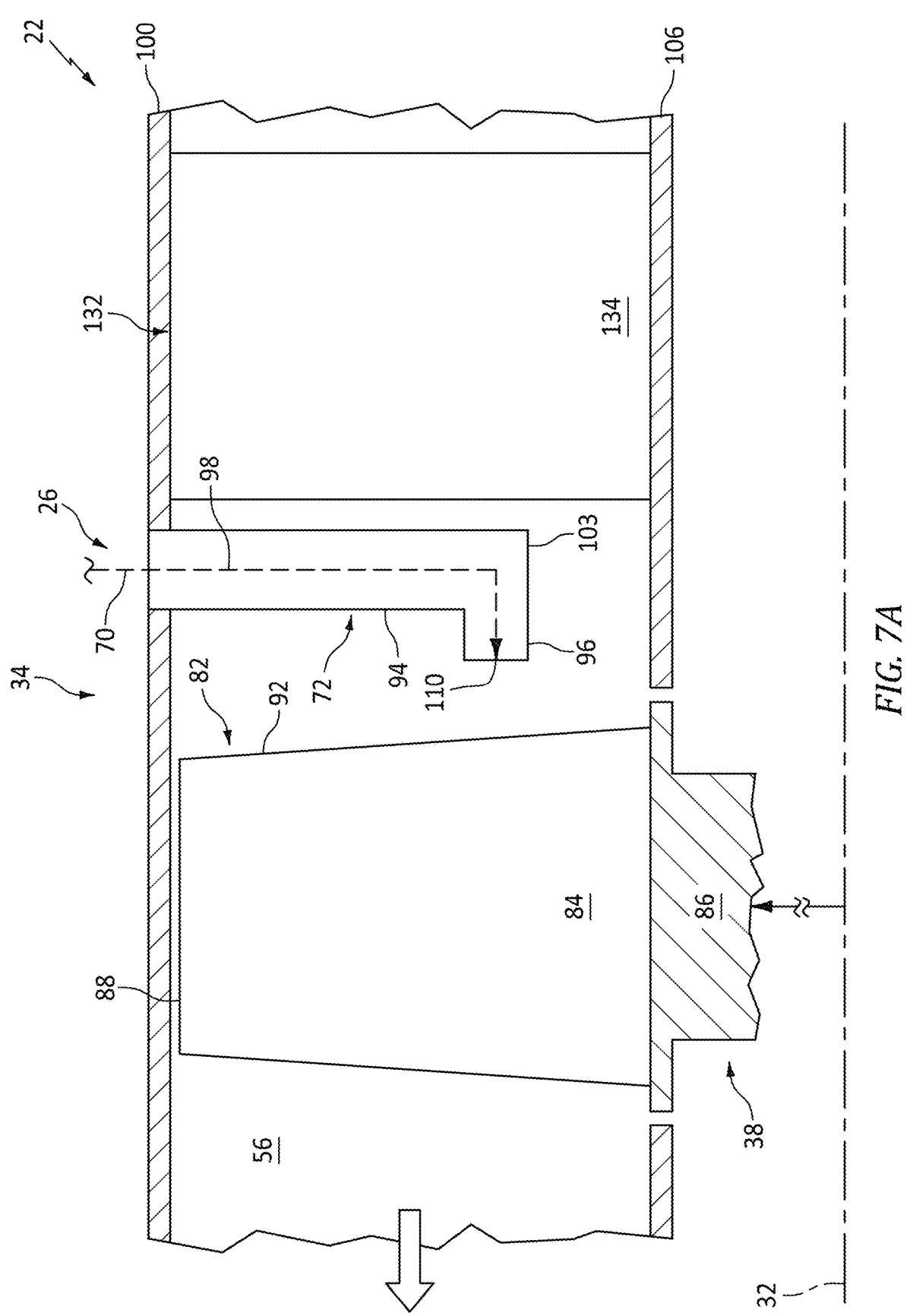
FIGS. 7A and 7B are partial schematic illustrations along the core flowpath within the compressor section with the air injector array and a compressor vane structure in various arrangements.
Figure 7B:
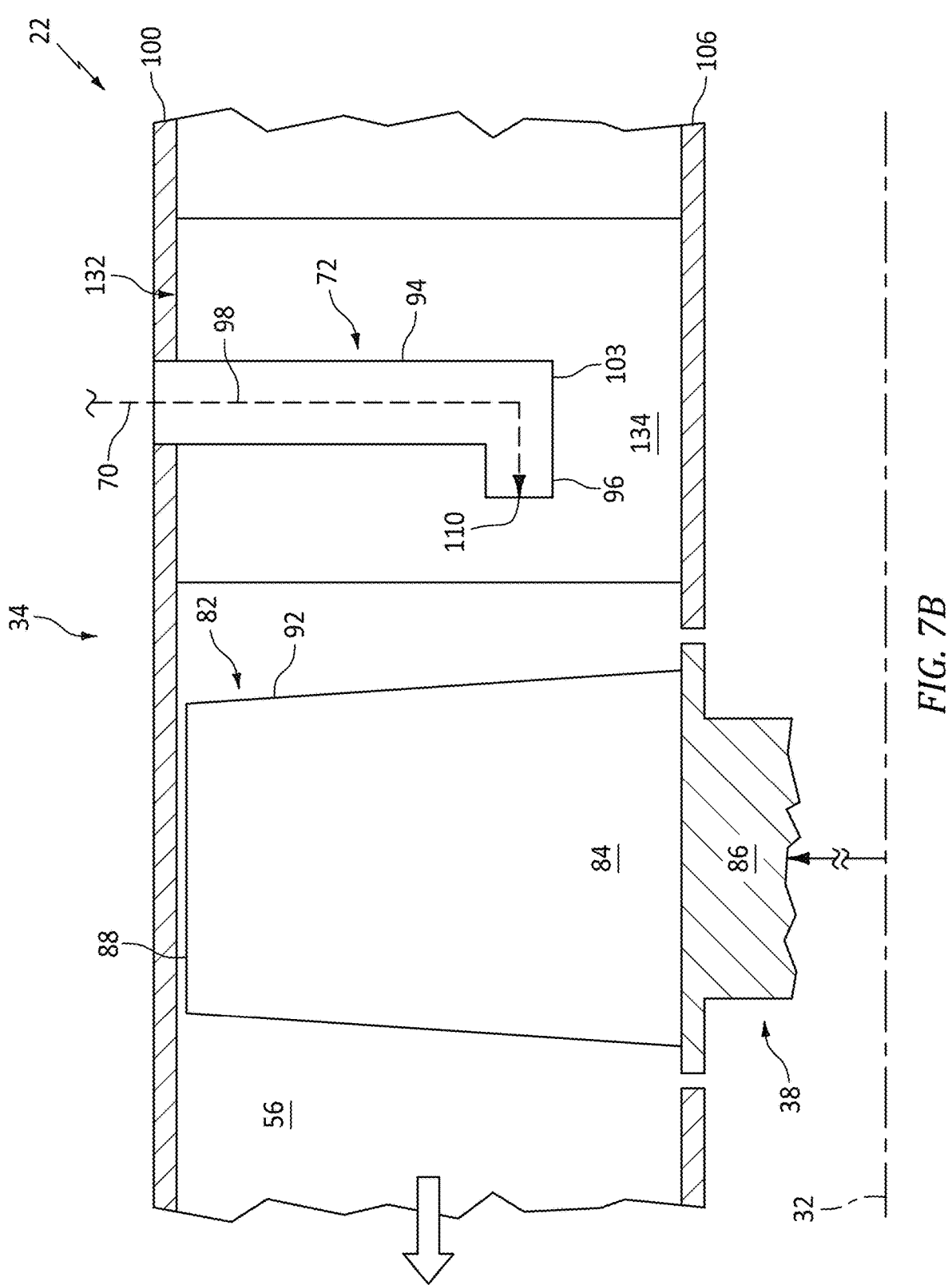

In some embodiments, referring to FIGS. 7A and 7B, the turbine engine 22 may include a compressor vane structure 132 upstream of the compressor rotor stage 82 and its array of compressor vanes 134 along the core flowpath 56. This compressor vane structure 132 may be configured to prepare (e.g., turn) the core air flowing within the core flowpath 56 for compression by the compressor rotor stage 82 and its array of compressor vanes 134 along the core flowpath 56. The compressor vane structure 132 of FIGS. 7A and 7B includes a plurality of compressor vanes 134 (e.g., fixed or pivotable stator vanes) that are arranged and may be equispaced circumferentially about the axis 32 in an annular array; e.g., a circular array. Each of the compressor vanes 134 extends substantially or completely radially across the core flowpath 56. The compressor vane structure 132 and its array of the compressor vanes 134 are disposed next to the compressor rotor stage 82 and its array of the compressor blades 84 longitudinally along the core flowpath 56. The compressor vane structure 132 and its array of the compressor vanes 134 of FIGS. 7A and 7B are disposed upstream of the compressor rotor stage 82 and its array of the compressor blades 84. In some embodiments, referring to FIG. 7A, the array of the air injectors 72 may be arranged at least partially or completely longitudinally between (a) the compressor vane structure 132 and its array of the compressor vanes 134 and (b) the compressor rotor stage 82 and its array of the compressor blades 84 along the core flowpath 56. In other embodiments, referring to FIG. 7B, the array of the air injectors 72 may be circumferentially interspersed with the array of the compressor vanes 134. Each air injector 72 of FIG. 8, for example, is disposed circumferentially between and is longitudinally overlapped by a respective circumferentially neighboring pair of the compressor vanes 134.

While the air injectors 72 are generally described above as being mounted to and/or projecting radially inward from the outer flowpath wall 100, the present disclosure is not limited to such exemplary arrangements. For example, referring to FIG. 9, it is contemplated one, some or all of the air injectors 72 in any one of the air injector arrangements described above may each be mounted to and/or project radially outward from the inner flowpath wall 106.

The aircraft powerplant 20 is described above with respect to FIG. 1 as a single turbine engine 22 powerplant for ease of description. The aircraft powerplant 20 of the present disclosure, however, is not limited to such an exemplary single turbine engine powerplant configuration. The aircraft powerplant 20 of FIG. 10, for example, includes multiple of the turbine engines 22A and 22B (generally referred to as "22"). With such a configuration, a first of the turbine engines (e.g., the turbine engine 22A or 22B) may be operated at a power setting above idle, while the second of the turbine engines (e.g., the turbine engine 22B or 22A) may be operated at a power setting at or below idle. In the event additional power is called for rapidly from the second of the turbine engines (e.g., the turbine engine 22B or 22A), then the air system 26 may be operated to boost power to its high speed rotating assembly 44 to facilitate a more rapid acceleration/spool up of its high speed rotating assembly 44.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft powerplant, comprising:
a propulsor rotor;
a compressor section arranged with a flowpath extending longitudinally through the compressor section, the compressor section comprising a compressor vane structure and a compressor rotor rotatable in a direction about an axis, the compressor rotor comprising a plurality of compressor blades, the compressor vane structure comprising a plurality of compressor vanes, the plurality of compressor vanes arranged circumferentially around the axis in a compressor vane array and disposed in the flowpath, and the plurality of compressor blades arranged circumferentially around the axis in a compressor blade array and disposed in the flowpath downstream of the plurality of compressor vanes; and
an air system including an air source, an air injector and an air circuit fluidly coupling the air source to the air injector, the air system configured to direct compressed air from the air source to the air injector through the air circuit, the air injector disposed within the flowpath next to the compressor blade array, the air injector disposed in the flowpath longitudinally between and adjacent the compressor vane array and the compressor blade array, the air injector including a stem and a nozzle, the stem projecting radially into the flowpath from a flowpath wall to a radial distal end of the air injector and forming an exterior surface of the air injector, the nozzle branching and projecting laterally out from a portion of the stem to a tip of the nozzle, and the air injector configured to direct a stream of the compressed air into the flowpath and against one or more of the plurality of compressor blades out from the tip of the nozzle to apply a rotational driving force onto the compressor rotor about the axis in the direction;
wherein the flowpath extends longitudinally through the compressor section from an inlet into the flowpath towards an exhaust from the flowpath, the flowpath has a radial height at an injector location, the air injector projects a radial distance into the flowpath at the injector location, and the radial distance is between one-quarter and three-quarters of the radial height.

2. The assembly of claim 1, wherein the radial distance is between three-quarters of the radial height and one-half of the radial height.

3. The assembly of claim 1, wherein the radial distance is between one-half of the radial height and one-quarter of the radial height.

4. The assembly of claim 1, wherein the radial distance is equal to or less than one-half of the radial height.

5. The assembly of claim 1, wherein
the nozzle is a first nozzle, and the air injector further includes a second nozzle;
the second nozzle branches and projects laterally out from a second portion of the stem to a tip of the second nozzle; and
the air injector is further configured to direct a second stream of the compressed air into the flowpath and against one or more of the plurality of compressor blades to apply an additional rotational driving force onto the compressor rotor about the axis.

6. The assembly of claim 5, wherein the first nozzle and the second nozzle are arranged at different radial positions along the stem.

7. The assembly of claim 1, wherein
the air injector includes a passage and a nozzle orifice;
the passage extends radially within the air injector;
the nozzle orifice extends laterally through a wall of the air injector from the passage to the flowpath; and
the air injector is configured to direct the stream of the compressed air into the flowpath through the nozzle orifice.

8. The assembly of claim 1, wherein the air injector is configured to direct the stream of the compressed air into the flowpath along a trajectory with an axial component and a tangential component.

9. The assembly of claim 1, wherein the air source comprises an air tank.

10. The assembly of claim 1, wherein the air source comprises a turbine engine.

11. The assembly of claim 1, further comprising:
a combustor section; and
a turbine section;
the flowpath extending longitudinally through the compressor section, the combustor section and the turbine section from the inlet into the flowpath to the exhaust from the flowpath.

12. The assembly of claim 1, further comprising:
a first turbine engine including the compressor section and a first rotating assembly;
a second turbine engine including a second rotating assembly; and
a drivetrain configured to operatively couple the first rotating assembly and the second rotating assembly to the propulsor rotor.

13. An assembly for an aircraft powerplant, comprising:
a compressor section arranged with a flowpath extending longitudinally through the compressor section, the compressor section including a compressor rotor and a compressor vane structure, the compressor rotor rotatable about an axis and comprising a plurality of compressor blades, the plurality of compressor blades arranged circumferentially around the axis in a compressor blade array and disposed in the flowpath, the compressor vane structure comprising a plurality of compressor vanes, and the plurality of compressor vanes arranged circumferentially around the axis in a compressor vane array and disposed in the flowpath; and
an air system including an air source, an air injector and an air circuit fluidly coupling the air source to the air injector, the air system configured to direct compressed air from the air source to the air injector through the air circuit, the air injector including a stem and a nozzle, the stem projecting radially into the flowpath from a flowpath wall to a radial distal end of the air injector and forming an exterior surface of the air injector, the nozzle branching and projecting laterally out from a portion of the stem to a tip of the nozzle, and the air injector configured to direct a jet of the compressed air into the flowpath and against the compressor blade array to apply a rotational driving force onto the compressor rotor about the axis;

wherein the air injector projects radially into the flowpath, and the air injector is disposed at an injector location longitudinally between and adjacent the compressor vane array and the compressor blade array; and wherein the flowpath has a radial height at the injector location, and the air injector projects a radial distance into the flowpath at the injector location, the radial distance is between one-quarter and three-quarters of the radial height.

14. The assembly of claim 13, wherein the plurality of compressor vanes are longitudinally upstream of the plurality of compressor blades along the flowpath.

15. An assembly for an aircraft powerplant, comprising:

a compressor section arranged with a flowpath extending longitudinally through the compressor section, the compressor section including a compressor rotor and a compressor vane structure, the compressor rotor rotatable about an axis and comprising a plurality of compressor blades, the plurality of compressor blades arranged circumferentially around the axis in a compressor blade array and disposed in the flowpath, the compressor vane structure comprising a plurality of compressor vanes, and the plurality of compressor vanes arranged circumferentially around the axis in a compressor vane array and disposed in the flowpath; and an air system including an air source, an air injector and an air circuit fluidly coupling the air source to the air injector, the air system configured to direct compressed air from the air source to the air injector through the air circuit, the air injector including a stem and a nozzle, the stem projecting radially into the flowpath from a flowpath wall to a radial distal end of the air injector and forming an exterior surface of the air injector, the nozzle branching and projecting laterally out from a portion of the stem to a tip of the nozzle, and the air injector configured to direct a jet of the compressed air into the flowpath and against the compressor blade array to apply a rotational driving force onto the compressor rotor about the axis;

wherein the air injector projects radially into the flowpath, the air injector is disposed at an injector location longitudinally between and adjacent the compressor vane array and the compressor blade array, the air injector is discrete from the plurality of compressor vanes, the air injector is disposed circumferentially between and next to a respective circumferentially neighboring pair of the plurality of compressor vanes, the flowpath has a radial height at an injector location, the air injector has a radial distance into the flowpath at the injector location, and the radial distance is between one-quarter and three-quarters of the radial height.

* * * * *